United States Patent [19]

Kamibayashi

[11] 3,994,651
[45] Nov. 30, 1976

[54] APPARATUS FOR REMOVING WASTE PORTIONS FROM HOLLOW MOULDED ARTICLES

[75] Inventor: Taketoshi Kamibayashi, Tokyo, Japan

[73] Assignee: Toyo Seikan Kaisha Limited, Tokyo, Japan

[22] Filed: Jan. 20, 1975

[21] Appl. No.: 543,009

[30] Foreign Application Priority Data
July 10, 1974   Japan .............................. 49-78885

[52] U.S. Cl. ............................... 425/297; 83/914;
156/69; 156/251; 156/267; 156/515;
156/530; 225/97; 225/102; 225/103; 264/95;
264/161; 425/242 B; 425/301; 425/302 B;
425/317; 425/324 B
[51] Int. Cl.² .................... B28B 21/22; B28B 21/76
[58] Field of Search ............. 83/914; 225/102, 103,
225/97; 156/69, 267, 516, 515, 530, 251;
264/95, 161; 425/302 B, 242 B, 308, 301,
324 B, 503, 297, 317

[56] References Cited
UNITED STATES PATENTS

| | | | |
|---|---|---|---|
| 2,890,483 | 6/1959 | Sobier | 225/102 X |
| 3,540,371 | 11/1970 | Rudolfrh | 83/914 |
| 3,548,695 | 12/1970 | Pearson | 83/914 |
| 3,661,492 | 5/1972 | Massa | 83/914 |
| 3,690,527 | 9/1972 | Bustraan | 225/97 |
| 3,704,188 | 11/1972 | MacDuff | 83/914 |

Primary Examiner—Edward G. Whitby
Attorney, Agent, or Firm—Wenderoth, Lind & Ponack

[57] ABSTRACT

While a series of hollow moulded articles interconnected by waste portions are successively moulded by a rotary moulding machine and are continuously conveyed by a pair of conveyors, the waste portions are removed from one end of each of the articles by applying a twisting force to the waste portions by means of cutter means. The waste portions are removed from the other end of each of the articles, and then such ends may be sealed.

6 Claims, 10 Drawing Figures

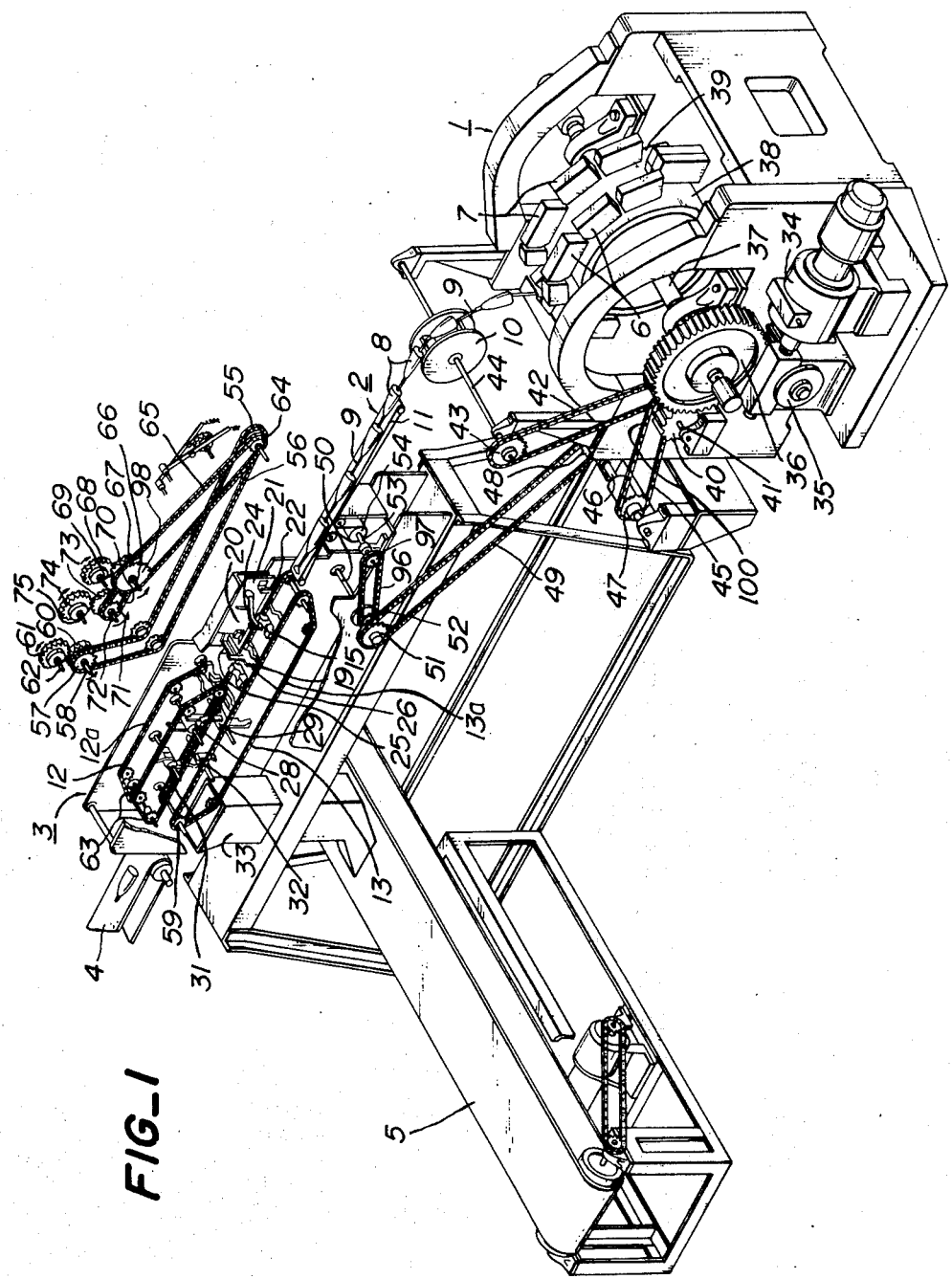
FIG_1

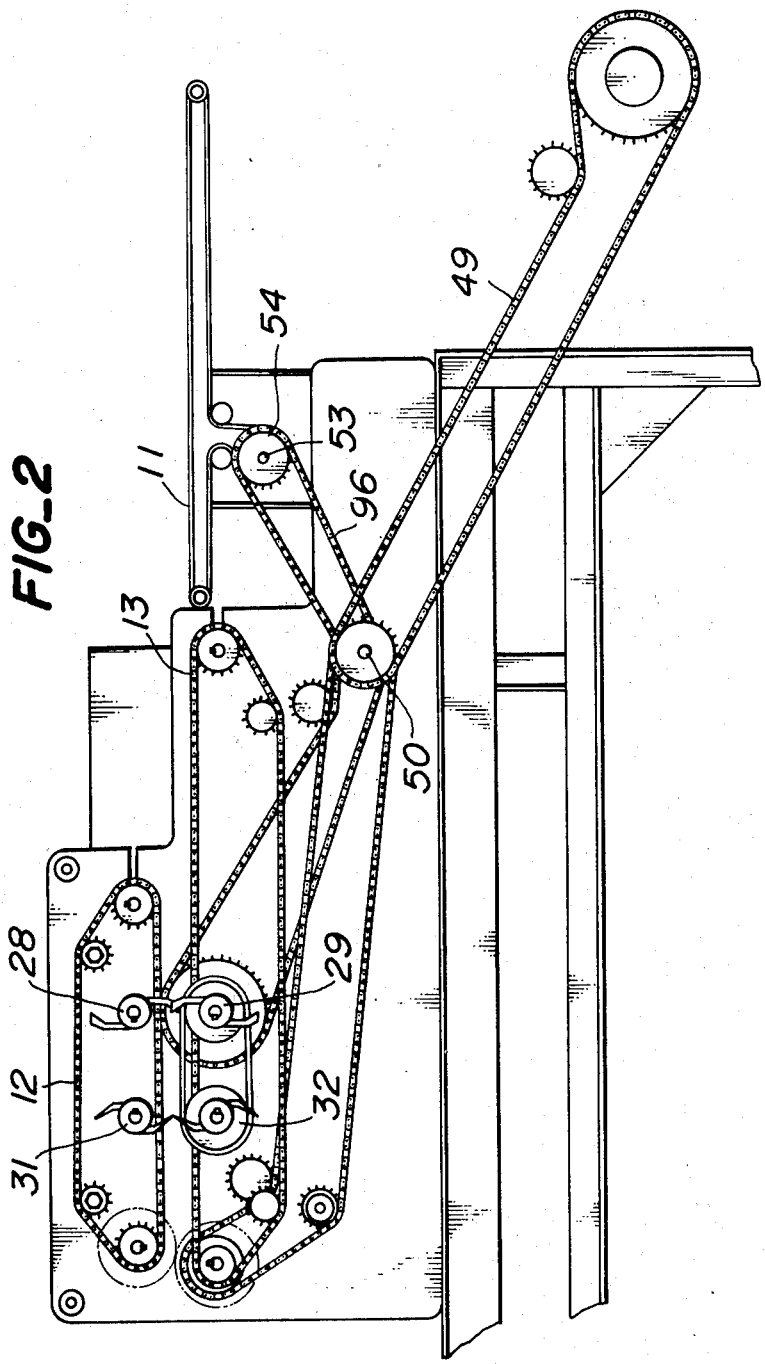

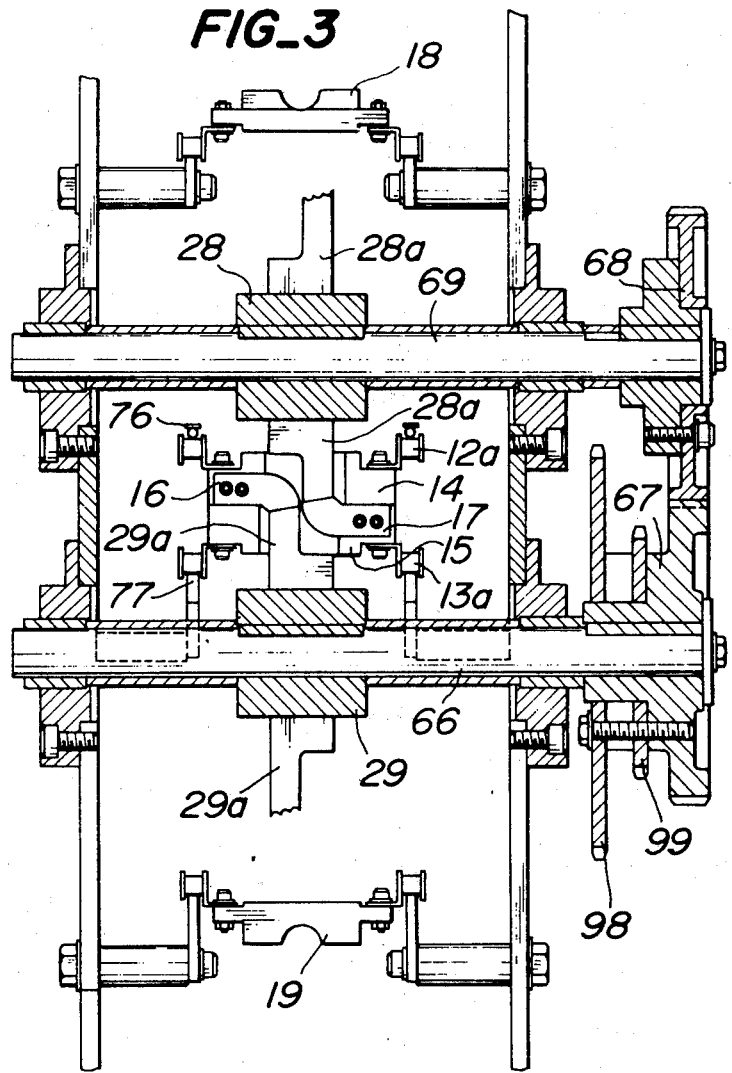
FIG_3

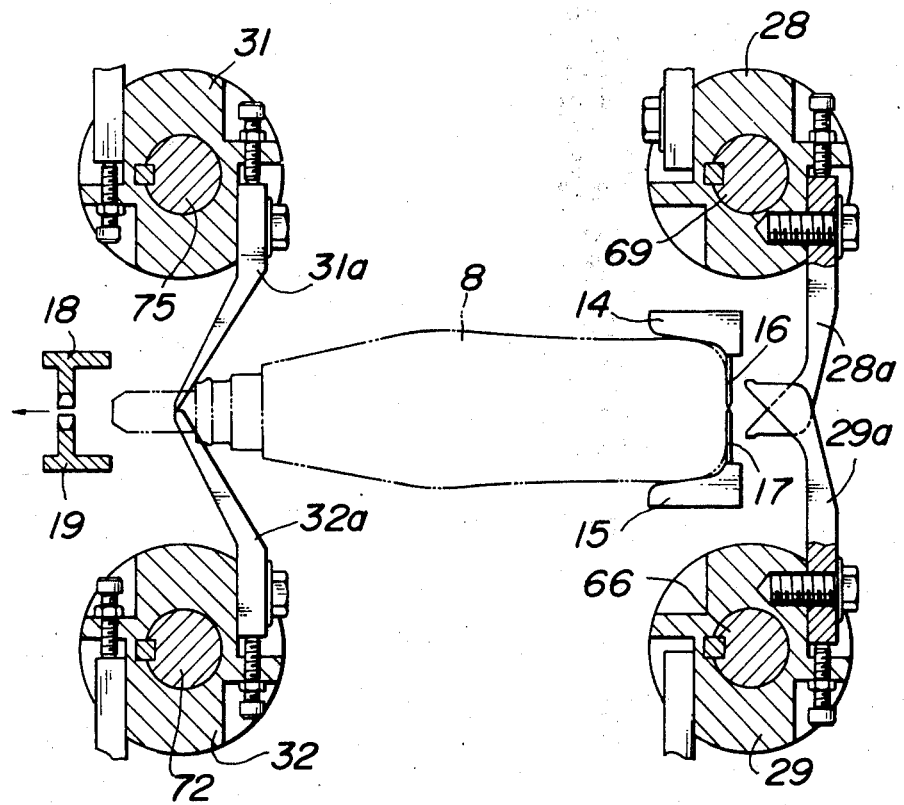
FIG_4

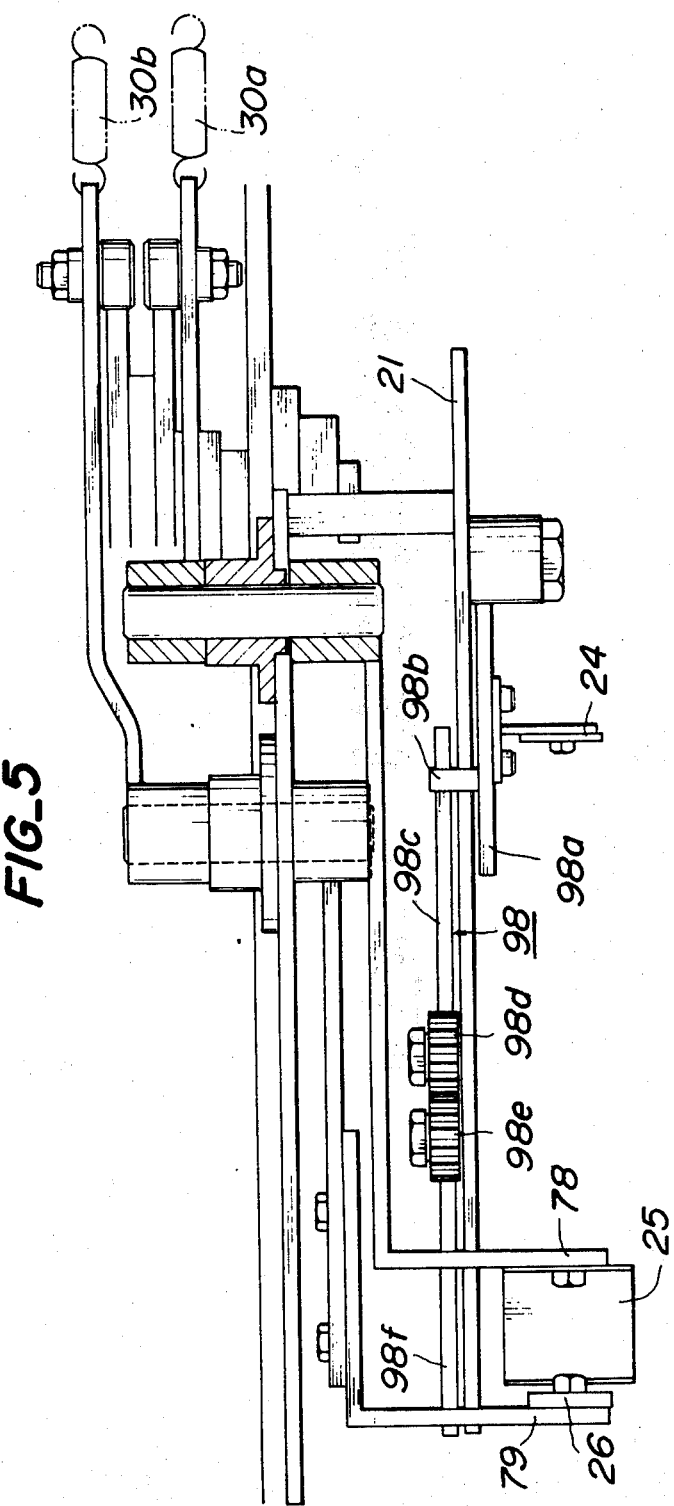
FIG_5

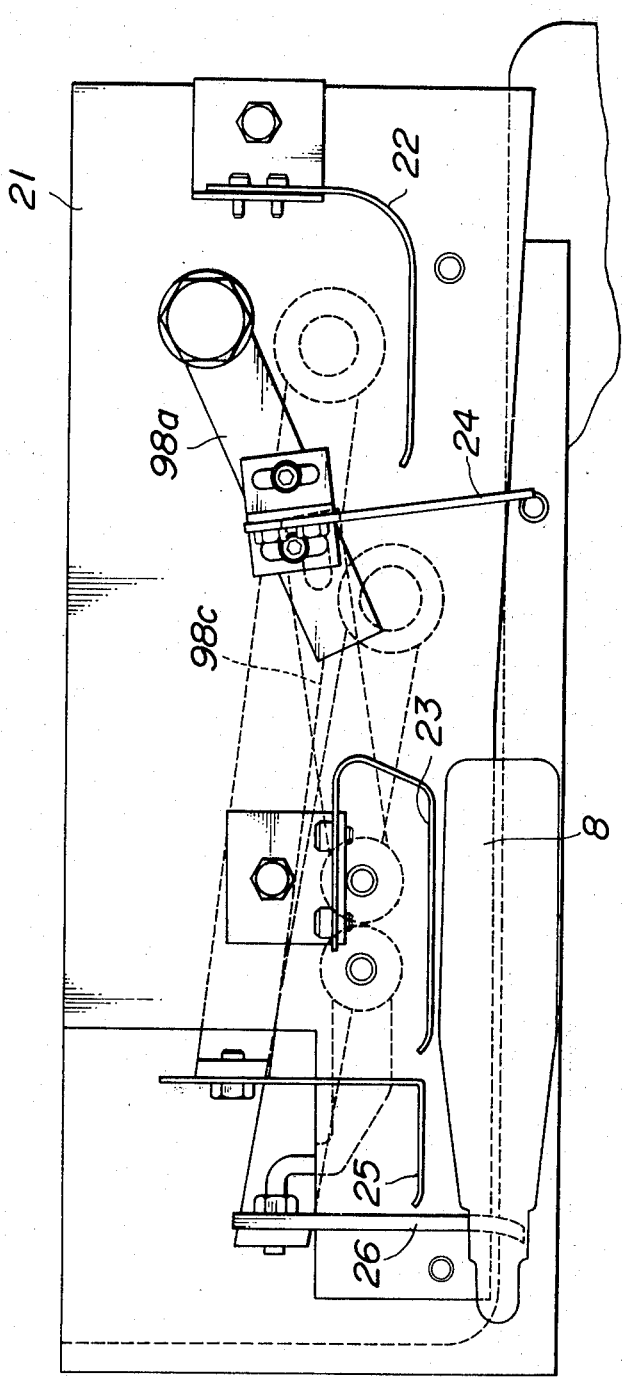

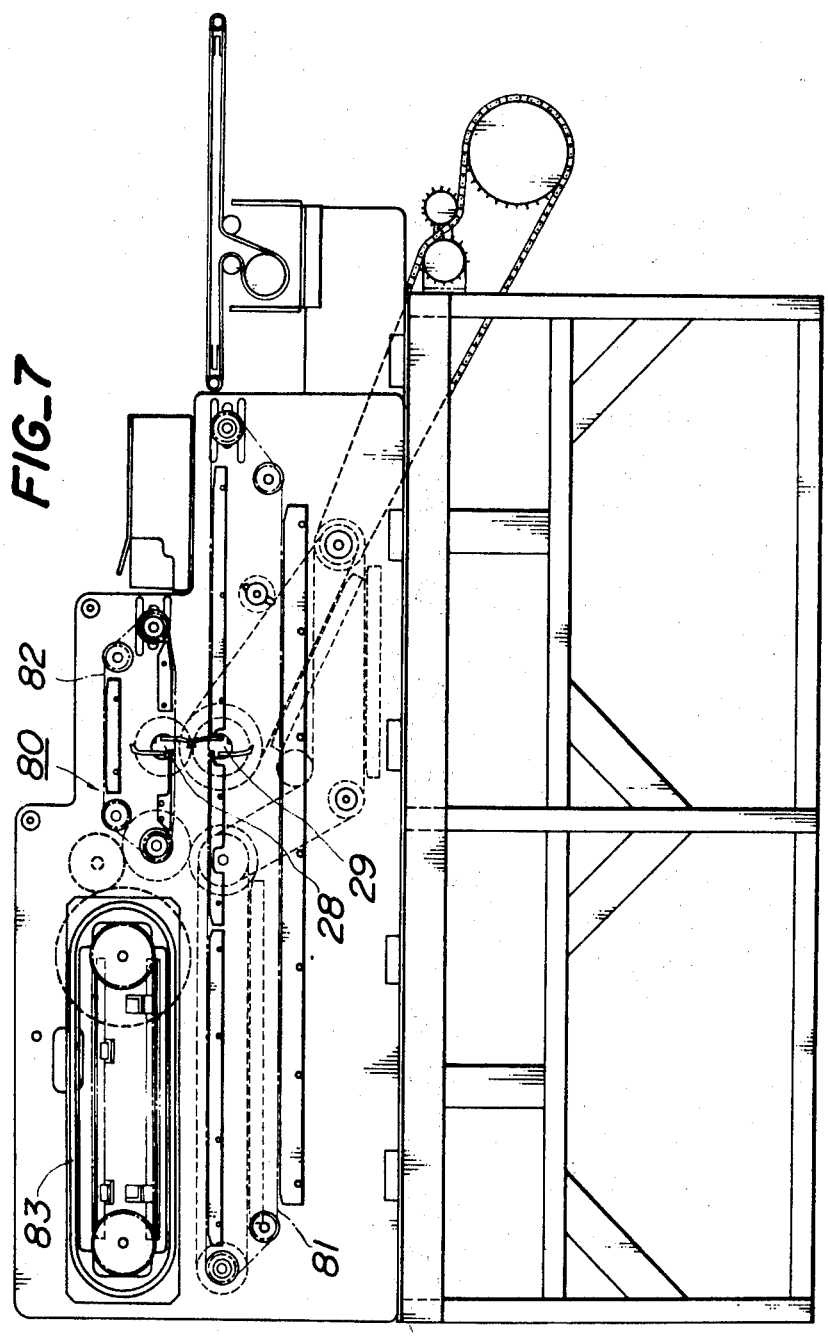

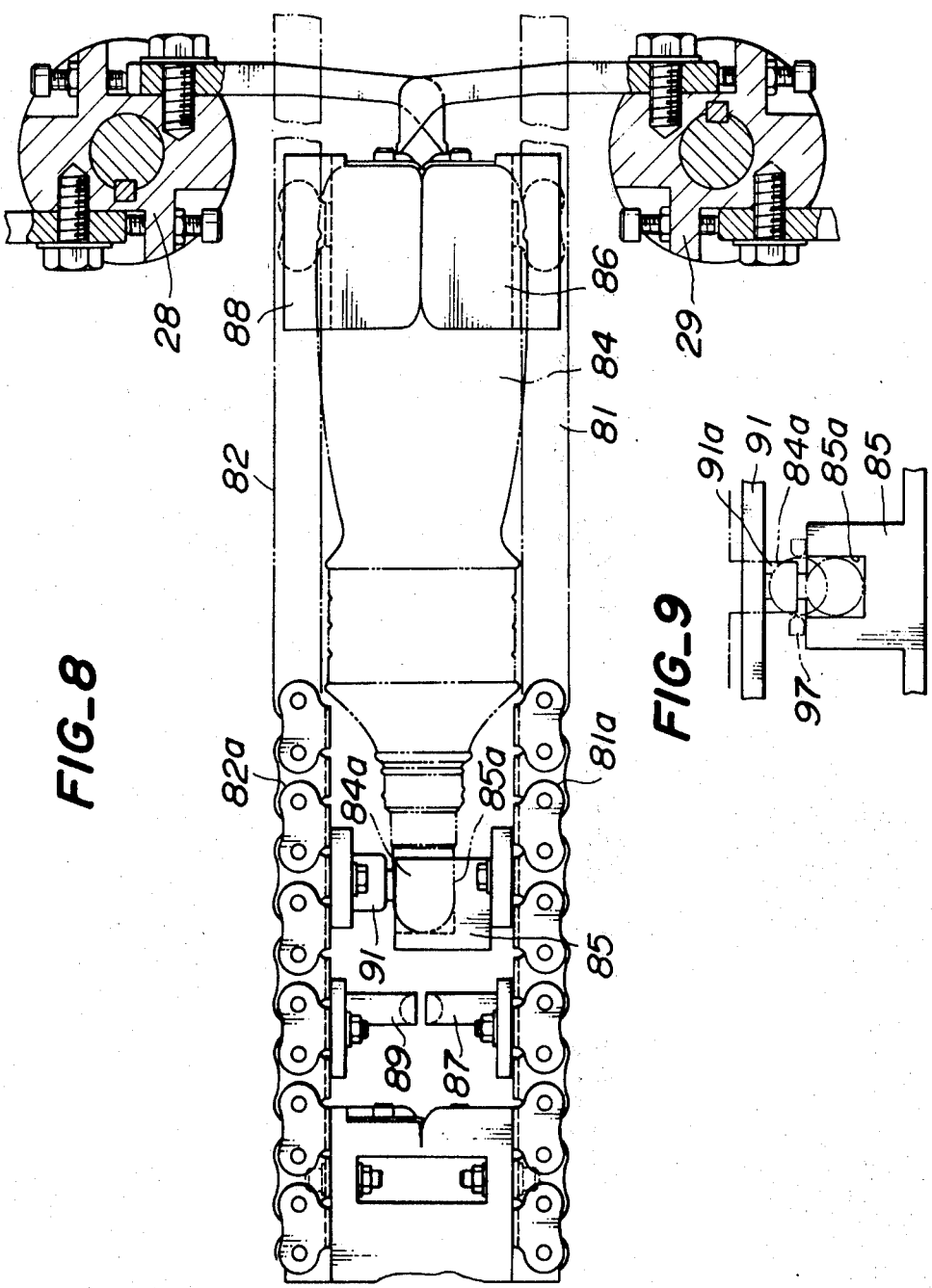

FIG_10
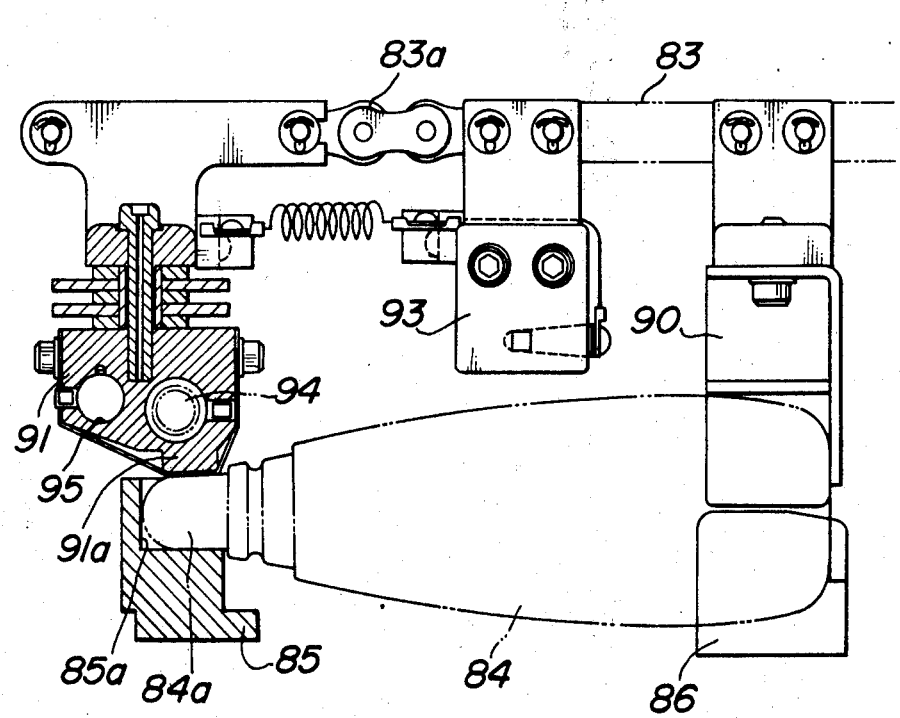

APPARATUS FOR REMOVING WASTE PORTIONS FROM HOLLOW MOULDED ARTICLES

BACKGROUND OF THE INVENTION

This invention relates to apparatus for removing waste portions from hollow moulded articles and more particularly apparatus for removing waste portions usually called "flash" from hollow articles, for example packing containers, continuously moulded by a rotary moulding machine.

In one type of a rotary moulding machine designed for the mass production of a single type hollow article, the hollow articles are continuously sent out from the moulding machine while they are connected together by rod-shaped waste portions. Hollow articles moulded by a rotary moulding machine usually have waste portions which are formed by the space between cooperating metal mould halves so that it is necessary to remove these waste portions and then feed the articles to a finishing machine. However, heretofore such waste portions have been removed by handwork so that such operation requires a large labour expense. Moreover, to manually remove the waste portions it is necessary to cool the moulded articles and waste portions which were heated at the time of moulding. In a moulding machine which continuously sends out the hollow moulded articles and the waste portions, it is thus necessary to provide a space for cooling, thereby increasing the floor space for the production line including the moulding machine.

SUMMARY OF THE INVENTION

Accordingly, it is an object of this invention to provide an improved apparatus for automatically removing waste portions from the hollow moulded articles sent out from a rotary moulding machine.

Another object of this invention is to provide an apparatus for satisfactory removing the waste portions at a high speed and which is suitable to use in combination with a rotary type moulding machine.

Still another object of this invention is to provide a new and improved apparatus for removing waste portions which requires a small space for cooling the moulded articles and waste portions, thereby reducing the floor space for a production line including such moulding machine.

A further object of this invention is to provide an improved apparatus for removing waste portions from hollow moulded articles capable of efficiently removing waste portions from the hollow moulded articles and of sealing the mouth of the articles after removing the waste portions therefrom.

According to this invention, there is provided an apparatus for removing waste portions from hollow moulded articles for use in a moulding line in which successive hollow moulded articles moulded by a rotary moulding machine and interconnected by waste portions are sent out continuously from the moulding machine, such apparatus including a pair of conveyors which are provided with opposed holders for holding the articles, cutter means for removing the waste portions from one end of each of the articles by applying a twisting force to the waste portions while the articles are held by the holders and conveyed by the conveyors, means for separating the waste portions from the other end of each of the articles, and means for driving the conveyors and cutters in synchronism with the rotary moulding machine.

According to this invention, there are also provided a sealing head and a support which cooperates with the sealing head for pressing flat and heat sealing the mouth of the hollow moulded article. The support may be carried by an extension of one of the pair of conveyors, and the sealing head may be carried by an additional conveyor driven in synchronism with the pair of conveyors.

BRIEF DESCRIPTION OF THE DRAWINGS

Further objects and advantages of the invention can be more fully understood from the following detailed description taken in conjunction with the accompanying drawings in which:

FIG. 1 is a diagrammatic perspective view, partly broken away, of one embodiment of this invention;

FIG. 2 is a side view of certain portions of the apparatus shown in FIG. 1;

FIG. 3 is a sectional view, partly broken away, of the cutter utilized in the apparatus shown in FIG. 1;

FIG. 4 is a side view, partly broken away, of the cutter;

FIG. 5 is a plan view of an inserting mechanism, with a portion thereof removed;

FIG. 6 shows a side view of the inserting mechanism shown in FIG. 5;

FIG. 7 is a diagrammatic side view of a modified embodiment of this invention;

FIG. 8 is a side view of the heat sealing mechanism, partly in section, and with some portions removed;

FIG. 9 is a side view of a portion of the heat sealing head; and

FIG. 10 is a side view, partly in section of heat sealing means.

DESCRIPTION OF THE PREFERRED EMBODIMENT

Referring now to the accompanying drawings, a preferred embodiment of this invention shown in FIGS. 1 and 2 comprises a plurality of pairs of mould halves 6 and 7 which are made of metal and constructed to be closed and opened during rotation. Parisons, not shown, are supplied to the pairs of mould halves while they are opened and when the pairs of mould halves are closed pressurized air is supplied into the parisons through one of the mould halves so as to blow mould hollow articles which are used as containers. After moulding, the mould halves are opened to take out moulded articles 8. As diagrammatically shown in FIG. 1, the moulded articles 8 are connected by strip shaped waste portions 9 to form a chain with their openings directed forwardly. The chain is advanced to a take out device 2 to be described later through a guide wheel 10. When moulding the hollow articles 8 by mould halves 6 and 7, portions which connect the waste portions 9 to the articles 8 are made thin for facilitating the removal of the waste portions 9, such thin portions also determining the positions at which the waste portions 9 are separated from the moulded articles 8. The take out device 2 comprises a belt conveyor 11 for conveying the chain including the moulded articles 8 and the waste portions 9 to a waste portion removing device 3. While being conveyed by the belt conveyor 11, the moulded articles and the waste portions are cooled.

As shown in FIG. 1 and FIGS. 3 to 6 inclusive, there are provided upper and lower chain conveyors 12 and 13, the latter extending rearwardly to cooperate with the belt conveyor 11 of the removing device 2. The endless chains 12a and 13a of the belt conveyors 12 and 13 are provided with spaced apart opposed holders 14 and 15 which hold the ends, that is the bottoms of the hollow articles 8 opposite to the ends thereof through which air was blown into the parisons. The holders 4 and 5 are supported by bottom supporting levers 16 and 17 respectively. Between the holders 14 and 15, the endless chains 12a and 13a are provided with holders 18 and 19, respectively, which clamp the portions of the articles 8 near their mouths through which air was blown into the parisons.

Above the portion of the lower conveyor 13 which extends beyond one end of the upper conveyor 12 is positioned an inserting mechanism 20 which corrects the mutual spacings between adjacent moulded articles 8 and then inserts the same between holders 14 and 15. The inserting mechanism 20 comprises first and second resilient guide plates 22 and 23 which can resiliently deform in the vertical direction and are secured to a side plate 21, a first neck clamping plate 24 disposed between the guide plates 22 and 23 to freely rotate in the vertical direction, an upper clamping plate 25 disposed in front of the second guide plate 23 to be rotatable in the vertical direction and a second neck clamping plate 26 disposed in front of the clamping plate 25 to be rotatable in the vertical direction. The upper clamping plate 25 and the second neck clamping plate 26 are secured to levers 78 and 79 respectively which are biased by springs 30a and 30b respectively. The first neck clamping plate 24 is arranged to cooperate with an interlocking mechanism 98 including a first lever 98a pivotably mounted on the side plate 21, a pin 98b, a second lever 98c, a gear 98d secured thereto and journalled by the side plate 21, a gear 98e meshing with gear 98d and a third lever 98f with one end secured to gear 98e and the other end secured to the lever 79 of the second neck clamping plate 26.

The hollow articles 8 are conveyed toward the left as viewed in FIG. 1 by the conveyor 11 of the removing device 2. After passing through the first guide plate 22 when the hollow article 8 is positioned at a high level, it is pressed downwardly until its bottom is supported by the holder 15 of the lower conveyor 13. At this time, a flat portion of the waste portion 9 near the mouth is supported by the holder 19 of the removing device. When the article 8 passes by the first neck clamping plate 24 and when the pitch or the spacing between adjacent articles is different from a predetermined pitch the clamping plate 24 functions to correct the pitch of the articles 8 so as to make the pitch equal to the pitch of the holders 15. Under these conditions, the moulded articles are conveyed by the under conveyor 13 to pass by the second guide plate 23, the upper clamping plate 25 and the second neck clamping plate 26 whereby the position of the articles are controlled by urging the bottoms of the articles 8 against the holders 15 with the bottom surface abutted against the bottom supporting plates 17 of the holders 15 (see FIG. 4) whereby the pitch of the articles are made to coincide exactly with that of the holders 15. Under these conditions, the bottoms of the moulded articles 8 mounted on the lower holders 15 are also supported by the holders 14 of the upper conveyor 12 while at the same time the waste portions 9 near the mouths of the articles 8 are held by the holders 18 and 19 of the upper and lower conveyors 12 and 13.

Upper and lower rotary cutters 28 and 29 are rotatably mounted on the supporting frame 27 for the upper and lower conveyors 12 and 13. These cutters are provided with transversely extending members 28a and 29a with their outer ends bent to cross each other as shown in FIG. 4. Accordingly, as the cutters 28 and 29 are rotated, the bent portions of the members 28a and 29a apply a torque to the portion of the waste portion 9 connected to the bottom of the moulded article 8. Thus, one side of the waste portion is moved upwardly while the other side is moved downwardly whereby the waste portion 9 is twisted and separated from the bottom of the article 8.

A hollow article used as a container often has a raised or reentrant bottom so that the waste portion is connected to the center of the recessed center portion. With the cutting mechanism described above, since cutters 28 and 29 apply a twisting force on the opposite sides of the waste portion, it is severed at a portion close to the bottom of the moulded article. Accordingly, it is possible to simplify or eliminate the finishing work for finishing the severed portion at the bottom of the article without the fear of deforming the same. More particularly, when the waste portion is cut away from the hollow article by means of a cutter, some length of the waste portion will be left because the bottom is recessed, which makes difficult the finishing work. On the other hand, if the waste portion is separated from the moulded article by applying a pulling force, the bottom of the article would be deformed severely such that the article can not stand vertically, because such operation is usually performed before the moulded article cools down to room temperature. However, these difficulties can be eliminated by removing the waste portion by applying a twisting force to it as described above.

A pair of separating members 31 and 32 for separating the severed waste portion is mounted on the supporting plate 27 in front of cutters 28 and 29. The separating members 31 and 32 are provided with a pair of cooperating wings 31a and 32a as shown in FIG. 4 so as to cut away the waste portion 9 from the mouth of the moulded article 8 by causing the wings 31a and 32a to engage the upper and lower sides of the waste portion as the separating members 31 and 32 are rotated.

A conveyor 5 is provided beneath the separating members 31 and 32 to receive removed waste portions 9 through a chute 33. Thus, when the waste portions 9 separated from the articles 8 are released from the holders 18 and 19 at the rear ends of the conveyors 12 and 13, they fall onto the recovering belt 5 through the chute 33 and are collected at a suitable portion.

At the discharge end of the upper and lower conveyors 12 and 13 is disposed a conveyor 4 for conveying the completed articles 8. Thus, after removal of the waste portions 9, the articles 8 are released from holders 14 and 15 and then dropped onto the conveyor 4 and conveyed by it to the next station including a finishing machine not shown.

Mould halves 6 and 7 of the moulding machine 1, guide wheel 10, belt conveyor 11 of the take out device 2, the upper and lower conveyors 12 and 13 of the waste portion removing device 3, upper and lower cutters 28 and 29, and the separating members 31 and 32 are driven synchronously by a main motor 34 for operating these members with a suitable timing. More particularly, the mould halves 6 and 7 are driven by the main motor 34 through a reduction gearing 35, a large diameter gear 36, shaft 37 and supporting cylinders 38 and 39 respectively carrying the mould halves 6 and 7. The guide wheel 10 is driven by the large diameter gear 36 through a pinion 40 meshing therewith, a sprocket wheel (not shown) mounted on the shaft 41 of the pinion 40, an endless chain 42 driven by the sprocket wheel, and a sprocket wheel 43 mounted on a shaft 44 and driven by the endless chain 42. The belt conveyor 11 of the take out device 2 is driven by the shaft 41 of the pinion 40 through a sprocket wheel 100, an endless chain 45, a sprocket wheel 47 mounted on an intermediate shaft 46 and driven by the endless chain 45, a sprocket wheel 48 mounted on the intermediate shaft 46, an endless chain 49 driven by the sprocket wheel 48, a sprocket wheel 51 mounted on a distribution shaft 50, a sprocket wheel 52 mounted on the distribution shaft 50, an endless chain 96 driven by the sprocket wheel 52, a sprocket wheel 97 mounted on a shaft 53 and driven by the endless chain 96, and a driving roller 54 for driving the belt conveyor 11. The lower chain conveyor 13 of the waste portion removing device 3 is driven by the distribution shaft 50 through a sprocket wheel 55 mounted thereon, an endless chain 56, a sprocket wheel 57, a lower drive shaft 58, and a driving sprocket 59. The upper chain conveyor 12 is driven by a gear 60 mounted on the lower drive shaft 58, a gear 61 meshing with said gear 60, an upper drive shaft 62, and a sprocket wheel 63. The lower cutter 29 is driven by the sprocket wheel 64 mounted on the distribution shaft 50 through an endless chain 65, a sprocket wheel 98 and the shaft 66 of the lower cutter 29, whereas the upper cutter 28 is driven by a gear 67 on the lower cutter shaft 66, a gear meshing with said gear 67 and the shaft 69 of the upper cutter 28. The lower separating member 32 is driven by the sprocket wheel 99 mounted on the lower cutter shaft 66 (see FIG. 3), an endless chain 70, a sprocket wheel 71 and the shaft 72 of the lower separating member, whereas the upper separating member 31 is driven by a gear 73 mounted on the shaft 72 of the lower separating member, a gear 74 meshing with said gear 73 and the shaft 75 of the upper separating member. Conveyors 4 and 5 are driven by motors independent of the main motor 34.

As described above, as the mould halves 6 and 7, guide wheel 10, belt conveyor 11 of the take out device 2, and the upper and lower chain conveyors 12 and 13 are driven synchronously by the main motor 34, the hollow articles 8 and the waste portions 9 moulded by the metal halves 6 and 7 are conveyed smoothly so that holders 14 and 15 of the conveyors can positively and successively hold the articles 8. Since the upper and lower cutters 28 and 29 and separating members 31 and 32 are driven by the main motor 34 in synchronism with the metal mould halves 6 and 7 of the rotary moulding machine 1 removal of the waste portions 9 can be made at a good timing without stopping the conveyance of the moulded articles. Thus, it is possible to accurately and smoothly remove the waste portions at a high speed.

As shown in FIG. 3, guide rails 76 and 77 are provided for supporting the endless chains 12a and 13a of the upper and lower chain conveyors 12 and 13.

FIGS. 7 to 10 illustrate another embodiment of this invention incorporated with a heat sealing mechanism. In this embodiment, the lower conveyor 81 is extended in front of the upper conveyor 82 and a sealing conveyor 83 is provided above the extended portion of the lower conveyor 81. The lower conveyor 81 is provided with a plurality of supports 85 for supporting the extension 84a of the mouth of a hollow moulded article 84, the supports 85 being fixed at a predetermined spacing between holders 86 for holding the bottom of the article 84 and holders 87 at the removing section. Each support 85 is provided with a recess 85a having a width a little larger than the outer diameter of the extension 84a, as shown in FIG. 9. The endless chains 82a of the upper conveyor 82 are provided with holders 88, holders 89 at the removing section and removing members acting as clamping members respectively confronting with the holders 86 of the lower conveyor 81, holders 87 at the removing section and the supports 85. The endless chain 83a of the sealing conveyor 83 are provided with holders 90 and sealing head 91 similar to the holders 88 of the upper conveyor 82 and the holders 89 at the removing section, respectively. The sealing head 91 is provided with an electric heater 94 which is fed from a feed rail, not shown, through a conductive shoe 93 provided for the endless chains 83a, and a temperature controlling mechanism 95 which operates to maintain the temperature of the sealing head within a predetermined range. The sealing head 91 is also provided with a projection 91a arranged to be received in the recess 85a of the support 85 as shown in FIGS. 9 and 10.

Other elements of the embodiment shown in FIGS. 7 to 10 are constructed similarly to those shown in FIGS. 1 to 6, but a rotating separating member is not provided.

In the same manner as in the embodiment shown in FIGS. 1 to 6, the moulded article 84 is held by the holders 86 and 88 of the upper and lower conveyors 81 and 82, and while the article is held in this manner, the waste portion 97 is separated from the article 84 by pressing the waste portion by a clamping member at a point near the mouth of the article. At the same time, in the same manner as has been described in connection with the first embodiment the waste portion is twisted and severed near the bottom of the moulded article 84. Thereafter, the article is conveyed while it is supported by the holder 86 and the support 85 of the lower conveyor 81. At the same time, the holder 90 and sealing head 91 of the sealing conveyor 83 come to confront the holder 86 and support 85, respectively, whereby the moulded article 84 is held between holders 86 and 90 and the heated projection 91a of the sealing head 91 urges the elongation 84a at the mouth of the moulded article into the recess 85a of the support 85. Accordingly, the extension 84a is pressed flat and the separated waste portion is dropped at the fore ends of the lower conveyor 82 and the sealing conveyor 83. Thereafter, the moulded article 84 is released and discharged from the machine.

As described above, as the extension 84a of the mouth of the moulded article is pressed flat and heat sealed, foreign matters are prevented from entering into the hollow article 84 while it is transported or stored. The sealed extension 84a is cut away at the time of using the article 84. It should be understood that the sealing conveyor 83 is driven in synchronism with the upper and lower conveyors 82 and 81.

According to this invention, since support 85 and heat sealing head 91 are provided for the lower conveyor 81 and since there is provided the sealing conveyor 83 for pressing and heat sealing the extension 84a at the mouth of the moulded article, it is possible to simplify the construction and also decrease the length of the moulding line, as compared with the prior art apparatus in which the removing device of the waste portion and the sealing device are provided independently. It is also possible to perform continuously the removal of the waste portion and the sealing.

In the embodiment described above, cutters for twisting and severing the waste portion are provided on the side opposite to the side from which air is blown into the moulded articles and the member for removing the separated waste portion is situated on the side of blowing air, but the positions of the cutters and the member can be exchanged.

As described hereinbefore, the invention provides an improved apparatus capable of automatically removing the waste portions of the hollow moulded articles at a high speed and at a high efficiency. Moreover, as the waste portions are removed by mechanical means, it is possible to efficiently remove the waste portions while they are still at relatively high temperatures. Accordingly, it is possible to connect the apparatus directly to a rotary moulding machine thus decreasing the space required by a moulding line.

Further, in accordance with this invention, the extension at the mouth of the moulded article is pressed and heat sealed so that it is possible to prevent dust and foreign matters from entering into the hollow article, and such mechanism is combined with the apparatus for removing the waste portion so that it is possible to decrease the size of the entire machine.

While the invention has been shown and described in terms of some preferred embodiments thereof, it should be understood that many changes and modifications will readily occur to one skilled in the art without departing from the true spirit and scope of the invention as defined in the appended claims.

What is claimed is:

1. Apparatus for removing waste portions from hollow moulded articles for use in a moulding line in which successive hollow moulded articles moulded by a rotary moulding machine and interconnected by waste portions are continuously ejected from said moulding machine, said apparatus comprising:
   a pair of continuously moving conveyors provided with opposed holder means for holding said articles therebetween;
   cutter means for removing said waste portions from a first end of each of said articles by applying twisting force to said waste portions while said articles are held by said holder means and continuously conveyed by said conveyors;
   means for separating said waste portions from a second end of each of said articles; and
   means for continuously driving said conveyors, said cutter means and said separating means in synchronism with said rotary moulding machine.

2. The apparatus according to claim 1, wherein said cutter means comprises a pair of transverse shafts arranged at positions at the upper and lower sides of said articles and said waste portions; and a pair of cutters, one each supported by one of said shafts and extending vertically, the ends of said cutters being bent toward the bottom of said article and dimensioned such that when said arms are rotated by said shafts one bent end applies force to one side of said waste portion in one direction near a point at which said waste portion is connected to the bottom of said article, and the other bent end applies a force to the opposite side of said portion in the opposite direction near said point, thus twisting and separating said waste portion away from the bottom of said hollow article.

3. The apparatus according to claim 1, wherein said separating means comprises a pair of transverse shafts arranged at positions at the upper and lower sides of said articles and waste portions in front of said cutter means; and a pair of wing-shaped blades, one each supported by one of said shafts and extending to the axes of said articles and said waste portions, said blades being dimensioned such that when said shafts are rotated said blades engage said waste portions, thus severing said waste portions near the mouths of said articles.

4. The apparatus according to claim 1, further comprising sealing means, including a sealing head and a support cooperating with said sealing head, for pressing and heat sealing the mouth of said hollow moulded article.

5. The apparatus according to claim 4, wherein said support has therein a recess dimensioned for receiving the mouth of said hollow moulded article; and said sealing head includes an electric heater for heating the head and a projection dimensioned to be received in said recess for pressing flat and heat sealing the mouth of said hollow moulded article.

6. The apparatus according to claim 4, further comprising an additional conveyor carrying said sealing head and independent of said pair of conveyors, one of said pair of conveyors having an extension carrying said support, said additional conveyor being moved in synchronism with said pair of conveyors.

* * * * *